US006877975B2

(12) United States Patent
Wuchinich

(10) Patent No.: US 6,877,975 B2
(45) Date of Patent: Apr. 12, 2005

(54) ROLLING PIN HORN

(76) Inventor: David G. Wuchinich, 431 Hawthorne Ave., Yonkers, NY (US) 10705

( * ) Notice: Subject to any disclaimer, the term of this patent is extended or adjusted under 35 U.S.C. 154(b) by 187 days.

(21) Appl. No.: 09/978,858

(22) Filed: Oct. 16, 2001

(65) Prior Publication Data

US 2002/0056589 A1 May 16, 2002

Related U.S. Application Data

(60) Provisional application No. 60/240,995, filed on Oct. 17, 2000.

(51) Int. Cl.$^7$ ................................................. B06B 1/02
(52) U.S. Cl. .................... 425/174.2; 156/73.1; 228/1.1; 264/443
(58) Field of Search .............................. 156/73.1, 73.6; 264/443, 451; 425/3, 174.2; 228/1.1, 110.1

(56) References Cited

U.S. PATENT DOCUMENTS

| 5,057,182 A | | 10/1991 | Wuchinich ............... 156/580.2 |
| 5,087,320 A | * | 2/1992 | Neuwirth ................. 156/580.2 |
| 5,096,532 A | | 3/1992 | Neuwirth ................... 156/73.3 |
| 5,110,403 A | | 5/1992 | Ehlert ...................... 156/580.3 |
| 5,171,387 A | | 12/1992 | Wuchinich ............... 156/580.1 |
| 5,520,774 A | * | 5/1996 | Palacios et al. .......... 156/580.1 |
| 5,645,681 A | * | 7/1997 | Gopalakrishna et al. . 156/580.2 |
| 5,707,483 A | * | 1/1998 | Nayar et al. ............. 156/580.2 |
| 6,059,923 A | * | 5/2000 | Gopalakrishna .......... 156/580.2 |
| 2002/0068872 A1 | * | 6/2002 | Manna et al ............... 600/459 |

OTHER PUBLICATIONS

Blevins, Robert D. Formulas for Natural Frequencies and Mode Shapes, 1993, pp. 203–204, 205–206, 304.

* cited by examiner

Primary Examiner—Benjamin L. Utech
Assistant Examiner—Emmanuel S. Luk

(57) ABSTRACT

A tubular resonant mechanical horn having a contoured inner surface such that, under vibration, an output radial displacement is obtained on the outer surface of horn that is substantially uniform over its entire surface, for producing effects useful in continuous processes. The horn does not contain a node of motional displacement.

5 Claims, 8 Drawing Sheets

ROLLING PIN HORN

BACKGROUND—CROSS REFERENCES TO RELATED APPLICATIONS

This application is based on U.S. provisional application No. 60/240,995 filed Oct. 17, 2000.

BACKGROUND—FIELD OF INVENTION

This invention concerns the use of resonant vibration to perform cutting, welding, sealing, drying, laminating and all other processes known or found to be of use in processes involving the use of rotating applicators in the continuous treatment or manufacture of products.

BACKGROUND—DESCRIPTION OF PRIOR ART

The use of vibration to perform a variety of useful industrial processes is well known. In particular, the ultrasonic vibration of metal horns has been employed to weld thermoplastic materials together as well as to cut plastic, textiles and other materials. It has also be used to laminate thermoplastic films together and to form non-woven textiles by welding fibers together in a matrix or pattern so as to form a continuous cloth. These processes were initially performed using stationary horn applied against moving material usually carried underneath the surface of the horn by an endless belt or rotating cylindrical anvil. Wuchinich in U.S. Pat. Nos. 5,057,182 and 5,171,387 discusses and cites prior art concerning the application of stationary vibrating horns in the process industry.

Horns capable of rotation were then developed for the many applications just described. These horns contained a cylindrical surface that vibrated and rolled with the target material, thereby reducing the friction encountered by a stationary horn ever present upon a moving media. Because of their simplicity and economy of construction, transducers executing longitudinal motion, that is, motion directed along the axes of symmetry of the rotary horn, are almost always used to excite these horns. The design of such transducers is very well known, as is the use of slip rings to provide continuous connection of electrical current to the piezoactive components of the transducer and bearings to permit rotary motion of the transducer and horn. The design of such horns, and their use with longitudinal transducers and associated acoustic components, is described in variety of patents and art. U.S. Pat. Nos. 5,087,320, 5,096,532 and 5,110,403 show several different rotary horn design that employ either the use of Poisson coupled strain or the displacement produced by bending in cylinder having an axial hole to excite radial displacement of a cylindrical surface.

One of the problems encountered in use of rotary horns was immediately evident in the variation of radial displacement along their length. This variation, normally present as a diminution of displacement at points progressively farther from their center, is not desirable. Such variation can produce degraded process effects, such as inferior weld strength, insufficiently cut material or cosmetically defective appearance to the finished products.

U.S. Pat. No. 5,707,483 teaches a method of compensating for the variation in radial vibration in rotary horns or for producing a particular variation required of a specific process. In general, however, except for esoteric or very specialized process, uniform application is usually desired and any variation in radial displacement is undesirable. It is also of interest to the economy of manufacture that the length of rotary horns be as large as possible so that as few as possible horns are required to span a particular width of product. But inherent is production of radial displacement, as produced by heretofore inventions and art, is a restriction upon this length that is related to the wavelength of sound within the metal of which the horns are made.

Typically lengths greater than about 5 inches in rotary horns operating at 20 kHz exhibit unacceptable variation in radial displacement for many processes. The wavelength of sound in most metals of horns are made is approximately 10 inches at the oscillation frequency of 20 kHz. It is, of course, possible to extend the width of ultrasonic horns by designing them for use at frequencies below 20 kHz, but the intense audible sound produced at lower frequencies usually precludes this resort except in completely automated installations nor requiring human attendance or installations where the value of the resultant product affords the expense of sound proofed enclosures. Even horns having lengths less than 5 inches may show displacements that diminish as much as 20 percent from their maximum value, normally occurring at their center. And, as U.S. Pat. No. 5,707,483 illustrates, compensation for the inherent radial displacement variation of Poisson coupled horns requires complex and expensive alternation to their otherwise simple geometry.

All known rotary horns generating radial displacements, whether of the Poisson or bending moment type, rely upon the generation of substantial vibratory strain in one portion of their structure to produce either radial strain, as is the case with Poisson coupled horns, or circumferential bending as is the case with a well known horn shown as FIG. 20 in U.S. Pat. No. 5,096,532. It is well known in acoustic theory of solid mechanical resonators, of which these horns are representative, that such strains can occur at point of no or minimal displacement, known as a motional node and all such horns exhibit at least one motional node.

BRIEF DESCRIPTION OF THE INVENTION

The invention has the object of producing a rotary horn that does not contain any motional nodes and permits the production of radial motion that is substantially uniform over the length of horn The invention also has the object of producing a rotary horn that is not limited in length to a fraction of the wavelength of sound in the material of which it is made. The invention also has a further object of producing a rotary horn having the attributes just described that is capable of self excitation within the apparatus of a continuous treatment process.

Other objects, features and advantages of the invention will become apparent with reference to the drawings and the following description of the drawings, invention and claims.

REFERENCE NUMERALS IN DRAWINGS

Figure 1:
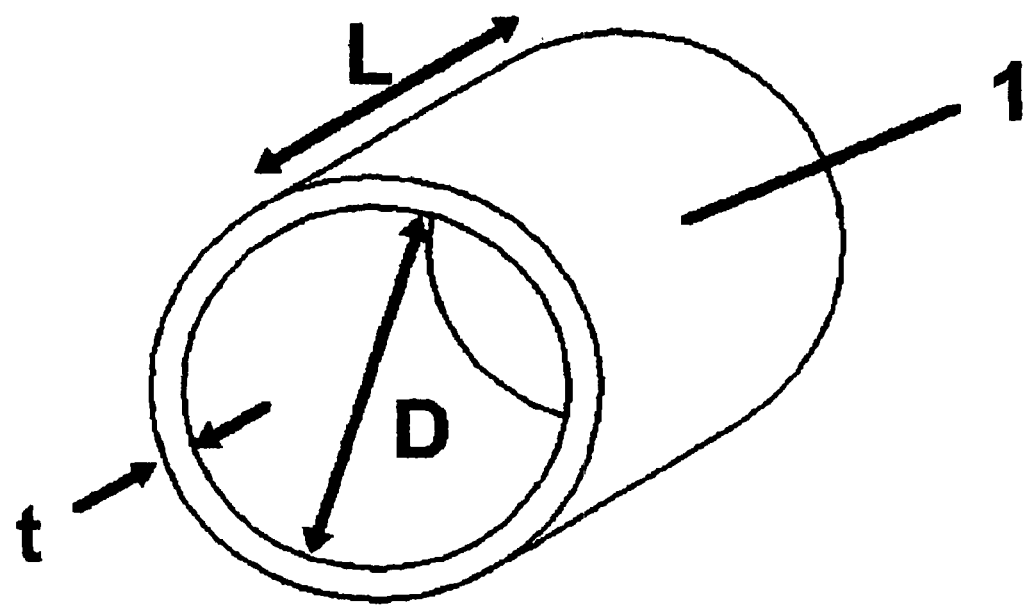
FIG. 1 is a drawing of a right circular cylinder radial resonator.

1 Output surface of right circular cylindrical resonator
2 Dilated shape profile of right circular cylindrical resonator
3 Contracted shape profile of right circular cylindrical resonator
4 Center of inner surface of rolling pin horn
5 Outer edge of inner surface of rolling pin horn
6 Direction of vibration of center of outer surface of rolling pin horn
7 Direction of vibration of one edge of the outer surface of rolling pin horn
8 Direction of vibration of opposite edge of outer surface of rolling pin horn
9 Direction of vibration at input face of exciting horn
12 Slot in exciting horn
13 Solid portion of exciting horn
14 Coupling boss in exciting horn
15 Opposite slot in exciting horn
16 Input coupling face of exciting horn
17 Concentricity control surface of exciting horn
18 Displacement amplifying horn
19 Bearing
21 Exciting horn
22 Rolling pin horn
24 Direction and magnitude of displacement of electro-mechanical transducer
25 Direction and magnitude of displacement at output of displacement amplifying horn
26 Axel of rotating anvil
27 Rotating anvil
28 Direction of rotation of anvil
29 intermediate layer of rolling pin horn
30 Outer layer of rolling horn
31 Entering process material
32 Exiting process material
33 Contact brush
34 Brush electrical contact
35 Electrical voltage and current source
36 Inner layer of rolling pin horn
37 Electrical conductor
38 Electro-mechanical transducer
39 Direction of rotation of rolling pin horn
40 Contoured inner surface of rolling pin horn

DETAILED DESCRIPTION OF THE INVENTION

FIG. 1 shows a right circular cylinder 1 having a length L, diameter D and wall thickness t. This cylinder is capable of executing resonant vibration in which the wall dilates and contracts rhythmically a frequency determined by the dimensions, density and elasticity of the cylinder material. Blevins provides formulae for the purpose of computing this frequency. If the thickness, t, and length, L, are much less than the diameter, D, this frequency is given by:

$$f = \left(\frac{1}{D}\right)\sqrt{\frac{Y}{\rho}} \qquad (1)$$

where Y is Young's modulus and $\rho$ is the density of material.

The ring executes at this frequency alternately an increase followed by decrease in its diameter f times per second. A unique characteristic of this vibration is the absence of a motion node. Every portion of the ring moves in oscillation.

If the length of the ring is not small compared to its diameter, so that the ring becomes a tube, the radial displacement is not uniform along the length of the tube. Blevins also provides approximate formulae for computing both the frequency and distribution of radial displacement along the tube's length:

$$f = \left(\frac{1}{D}\right)\sqrt{\frac{Y}{(1-\mu^2)\rho}} \qquad (2)$$

and for the radial displacement, $\xi$:

$$\xi = \xi_{max} \text{Sin}\left(\frac{\pi x}{L}\right) \qquad (3)$$

where $\mu$ is Poisson's constant for the material, which is the observed ratio of axial strain to radial strain in any solid material, and $\xi_{max}$ is the value of the radial displacement at the center of the tube.

Eq. 3 reveals that the radial displacement varies from a maximum at the center of the tube to a vanishing amount at the ends of the tube.

Figure 2:
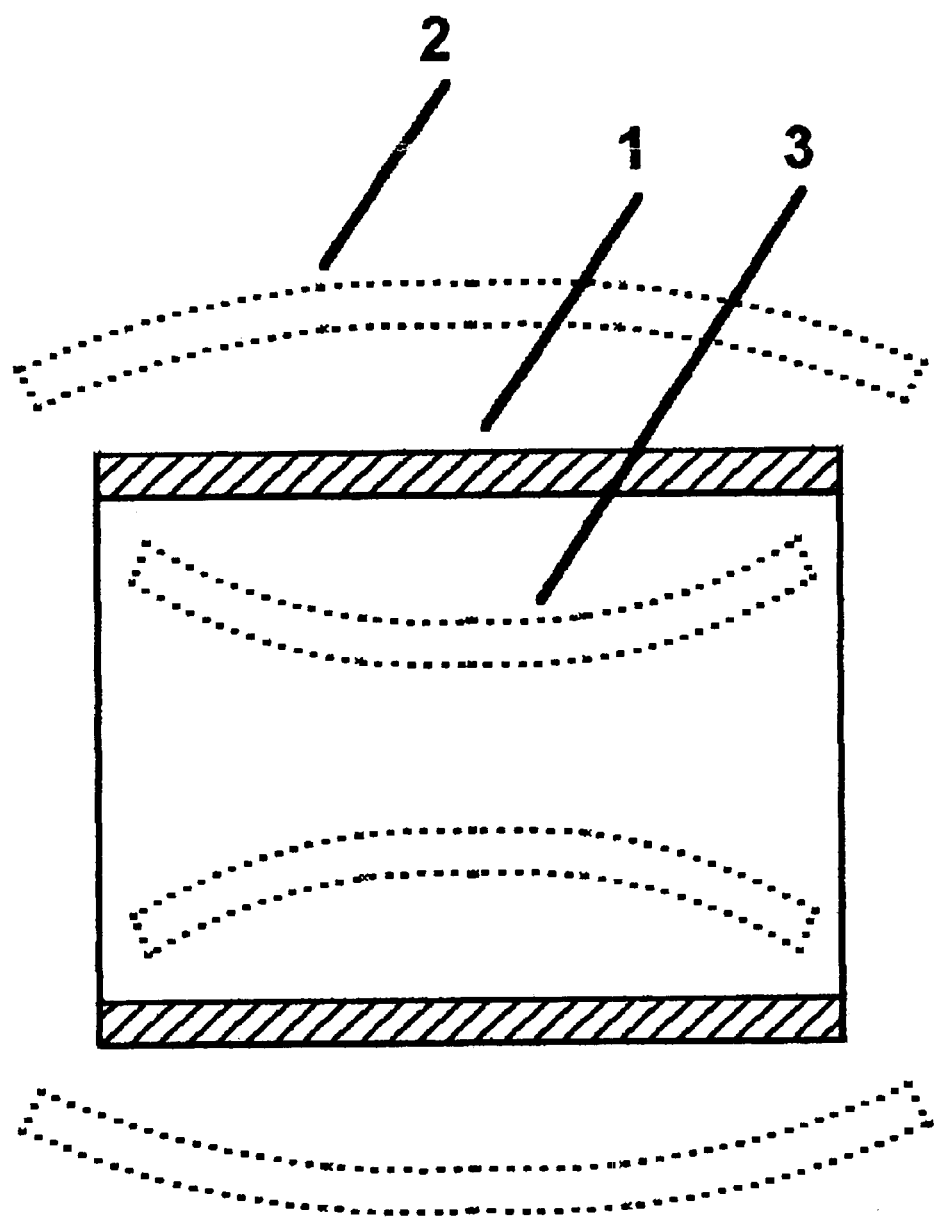
FIG. 2 is a drawing of the displacements of a right circular cylindrical radial resonator.

As a practical matter, complete analysis of the vibration of tubes, discloses that the radial vibration does indeed diminish at the ends of the tube, but does not vanish. It also reveals that axial motion, that is, motion of the surface of the tube parallel to the tube's axis, increases from a vanishing amount at the center of the tube to finite values at the ends. The displacement of tube's cross-section is shown in FIG. 2. The undisplaced shape, 1, is shown exaggerated and superimposed upon the dilated shape, 2, and contracted shape, 3. As with the vibratory pattern of the ring, there is no motional node in tubular resonators. Every portion of the tube moves, including the ends, which in the approximate analytical analysis, whose results are given by Eq. 3, are motionless.

Figure 3:
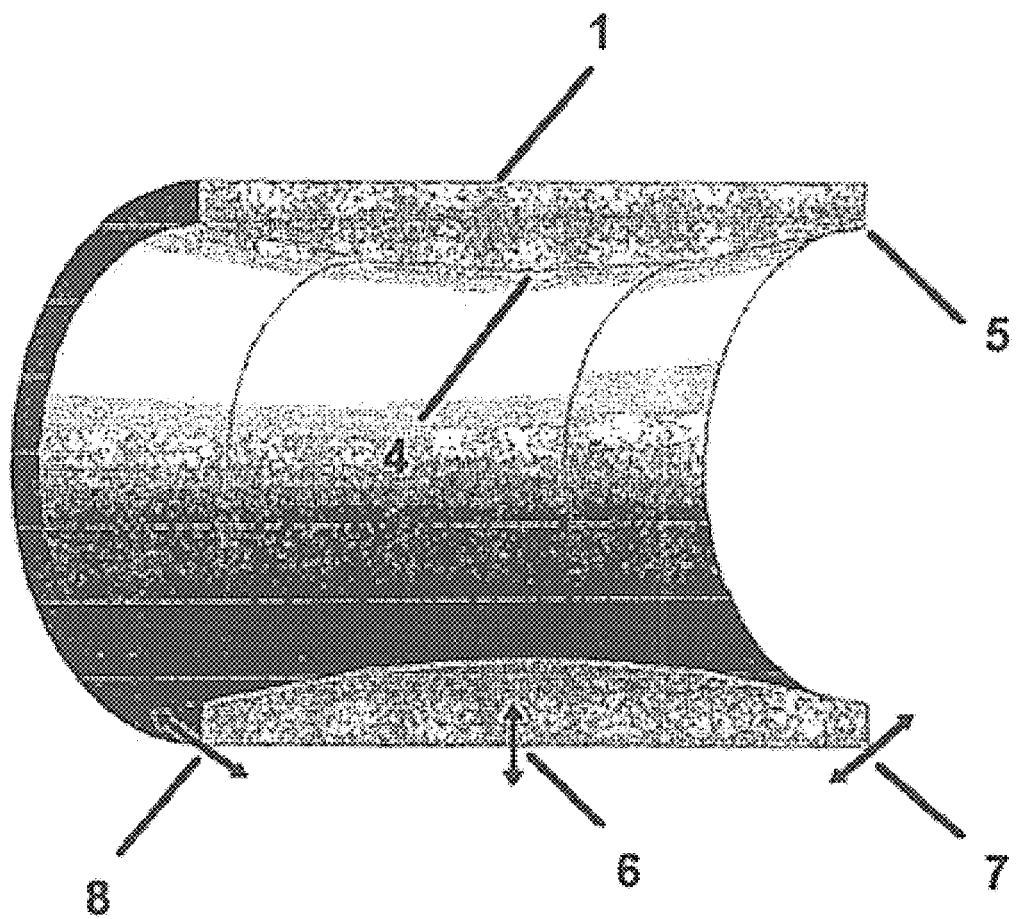
FIG. 3 is a shaded isometric view of an example of a right circular cylindrical radial resonator having a tapered inner diameter, hereafter known as a rolling pin horn.

Clearly, a right circular cylindrical tube does not offer uniform radial displacement over its surface. However, if the inner diameter of the tube is changed progressively such that the thickness of the wail, proceeding from the center of the tube to it ends, diminishes, it is possible to produce radial motion that is substantially uniform over the entire surface of the tube. FIG. 3 illustrates a geometrical example representing the invention.

In FIG. 3, which is a cross sectional view of the resonator, outer surface 1 forms a right circular cylinder. The inner diameter of the resonator tapers from a maximum value at the center, 4, to a minimum value, 5, at the ends. The motion is purely radial, 6, at the center of surface and contains both axial and radial components, 7 and 8, at the ends. If the taper is properly adjusted, along with the radius of the outer surface, the radial component of the displacement can be made substantially uniform over the length of the outer surface. Although an axial component of motion is present and varies substantially along the length of the surface, in many process useful to manufacture radial motion alone performs the desired cutting, laminating, welding or other process. In practice, both the taper and radius of the outer surface are adjusted, in repeated calculations, until the desired resonant frequency is obtained and the radial displacement is uniform. The taper may, of course, follow a mathematically defined contour designed to exactly equalize radial vibration or may be composed of a series of tapers, each designed to equalize the radial component vibration on the surface overlying its extent. Because of its resemblance to a common kitchen appliance this radially vibrating horn has been named a rolling pin horn.

Figure 4:
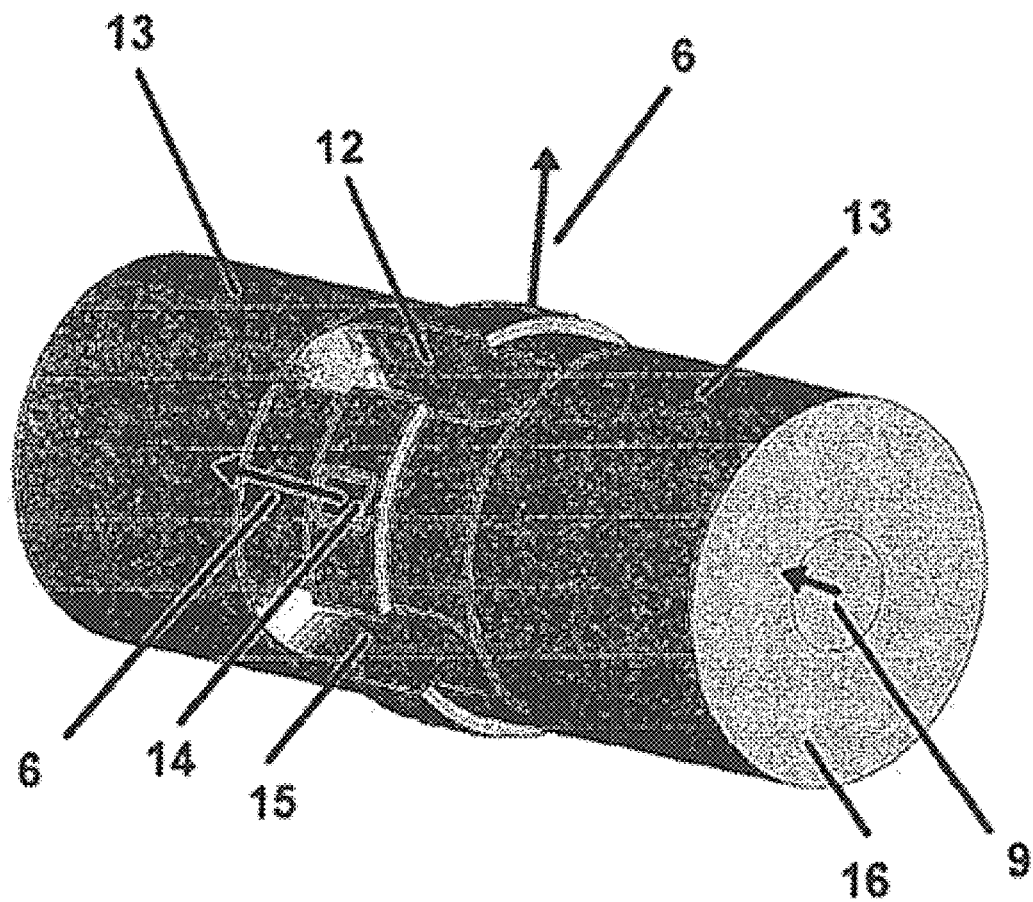
FIG. 4 is a shaded isometric view of a horn capable of exciting radial motion in a rolling pin horn.

To utilize the uniform vibration produced by the horn of FIG. 3, radial vibration must be excited. One method of providing an application of radial vibration is shown in FIG. 4. This horn is designed to receive an axial vibration input 9 at one face 16 and produce at four coupling bosses 14, spaced 90 degrees apart, radial motion 6. This horn is designed to act like two joined tuning forks, with the stem represented by solid sections 13 and the times represented by the material on either side of the two slots 15 and 12.

Figure 5:
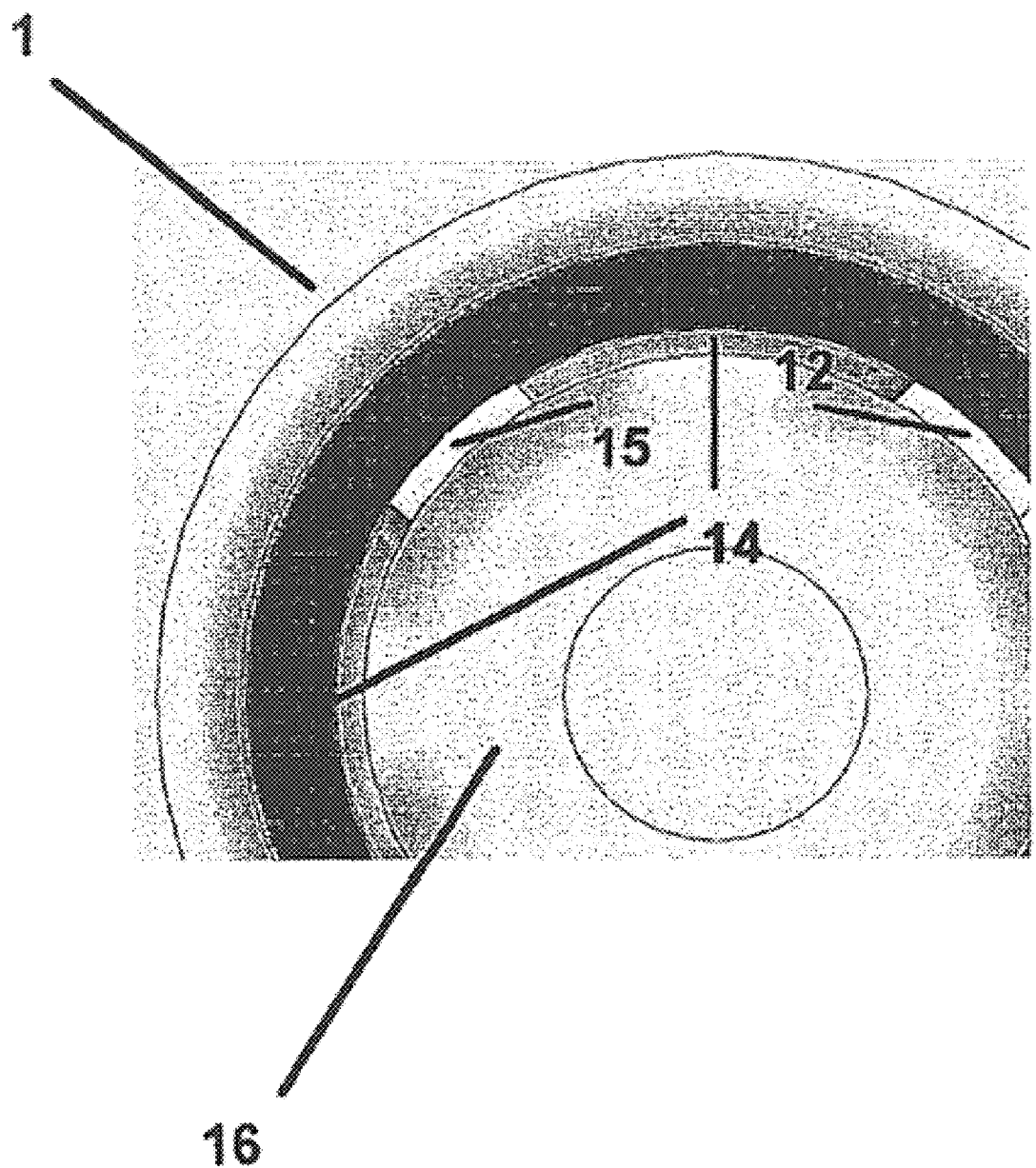
FIG. 5 is a shaded isometric view of the rolling pin horn in contact with the exciting horn of FIG. 4.

The horn of FIG. 4 is inserted into the inner diameter of the horn of FIG. 3 and is dimensioned such that the four coupling bosses contact at four point the center of the horn 4 shown in FIG. 3, imparting radial motion to the inner diameter of the rolling pin horn. The contact between the horns is further shown in FIG. 5 where an end view of the two combined horns is shown. Slots 12 and 15 and coupling face 16 are shown as well as the contact boss 14 between the horns which excites radial vibration on the output surface 1.

Figure 6:
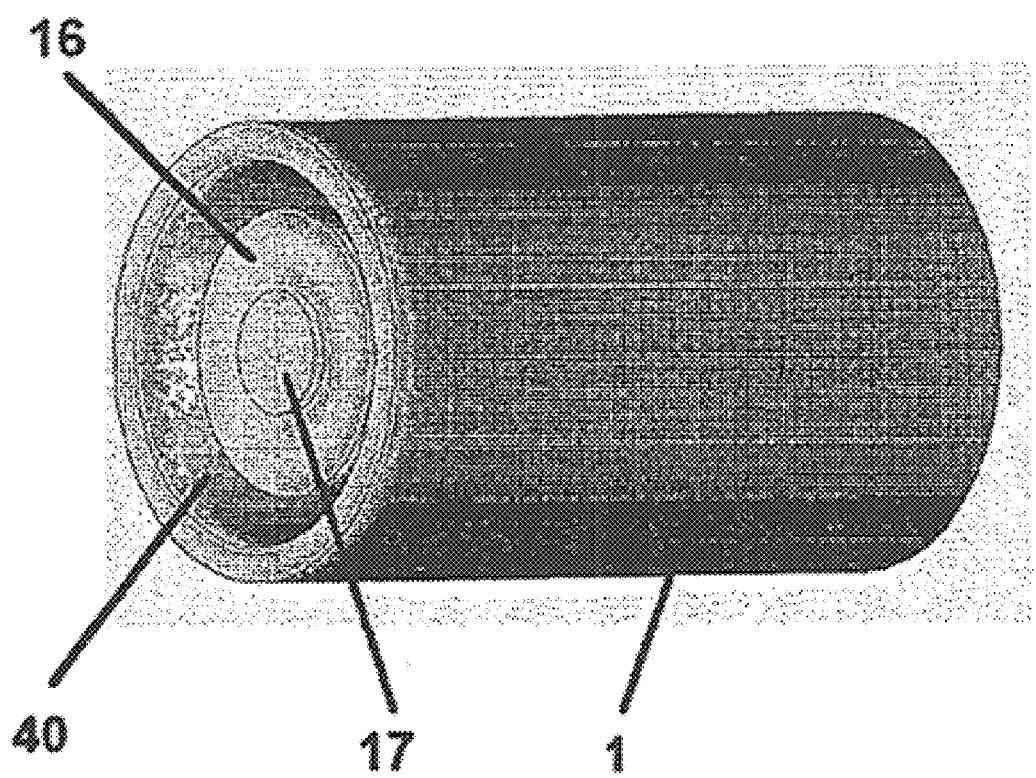
FIG. 6 is a detailed shaded view of the contact between the exciting horn and the rolling pin horn.

FIG. 6 is a shaded isometric drawing the combined horns. The raised portion 17 of the exciting horn is employed to maintain concentricity between the rolling pin horn and exciting horn under rotation. Axial vibration is applied to face 16 of the inner horn which produces uniform radial vibration on the output surface 1 of the rolling pin horn by virtue of the contoured inner diameter of this horn 40.

It also possible to use the radial rotary horns of prior art to excite the rolling pin horn and any of the horns disclosed in the art referenced in this application, suitably dimensioned, may be employed to communicate radial motion to the inner diameter of the rolling pin horn at its center where purely radial motion exists.

It is also possible to couple one or more horns together, end to end, by joining their exciting horns together, provided that all the individual horns are designed to operate at the same vibrational frequency. In such an arrangement the ends of the rolling pin horns are, in general, not joined as they may be vibrating exactly out of phase. When one horn is contracting, depending upon the operation of the exciting horns, be they of the construction of FIG. 4 or of the construction of the prior art, the adjoining rolling pin horn or horns may be dilating. Thus physical contact is not possible. However in processes utilizing vibration the phase of the vibration is generally not important so that combinations of rolling pin horns, each operating out of phase with its adjoining mates, may produce identical process results.

Figure 7:
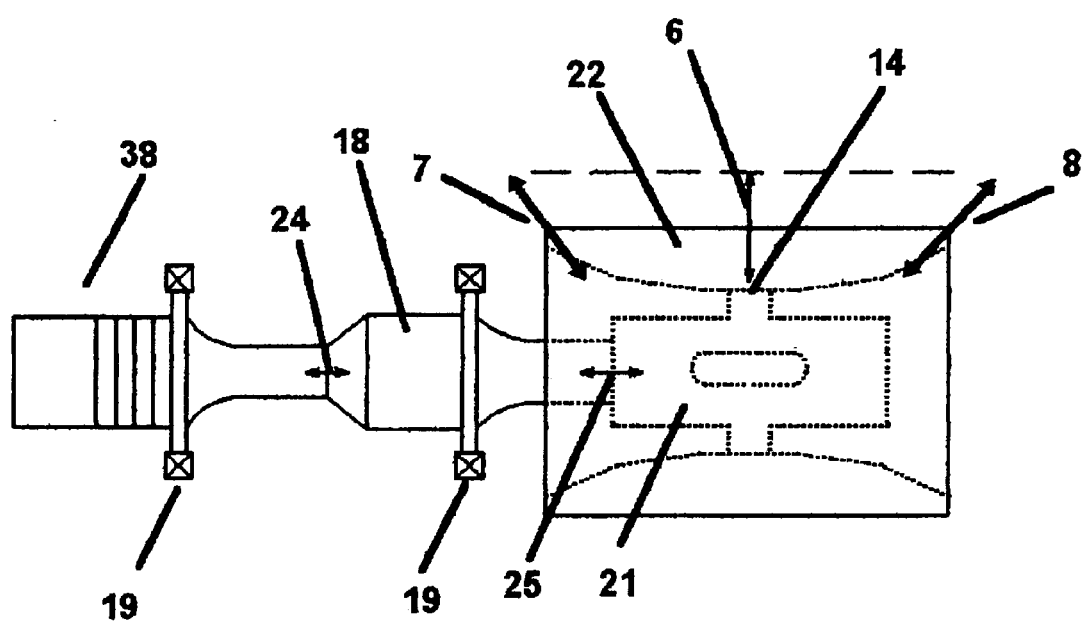
FIG. 7 is a drawing of the combination of the rolling pin horn, exciting horn, motion amplifying resonator and transducer supported in bearing capable of continuous rotation.

FIG. 7 is a mechanical schematic representation familiar to those skilled in the art of the interconnection between an electro-mechanical transducer 38 producing axial displacement 24, displacement amplifying horn 18 producing axial displacement 25, exciting horn 21 and rolling pin horn 22, together with bearings, 19, supporting the transducer and amplifying horn in rotation. Displacements 7 and 8 at the ends of the output surface of the rolling pin horn have the same radial magnitude as the purely radial displacement 6 at the center of the horn.

It is also possible to construct the rolling pin of a combination of materials, including piezo-active material, such that when a voltage and current of a suitable frequency is applied to the Piezo-active material radial vibration is produced.

Figure 8:
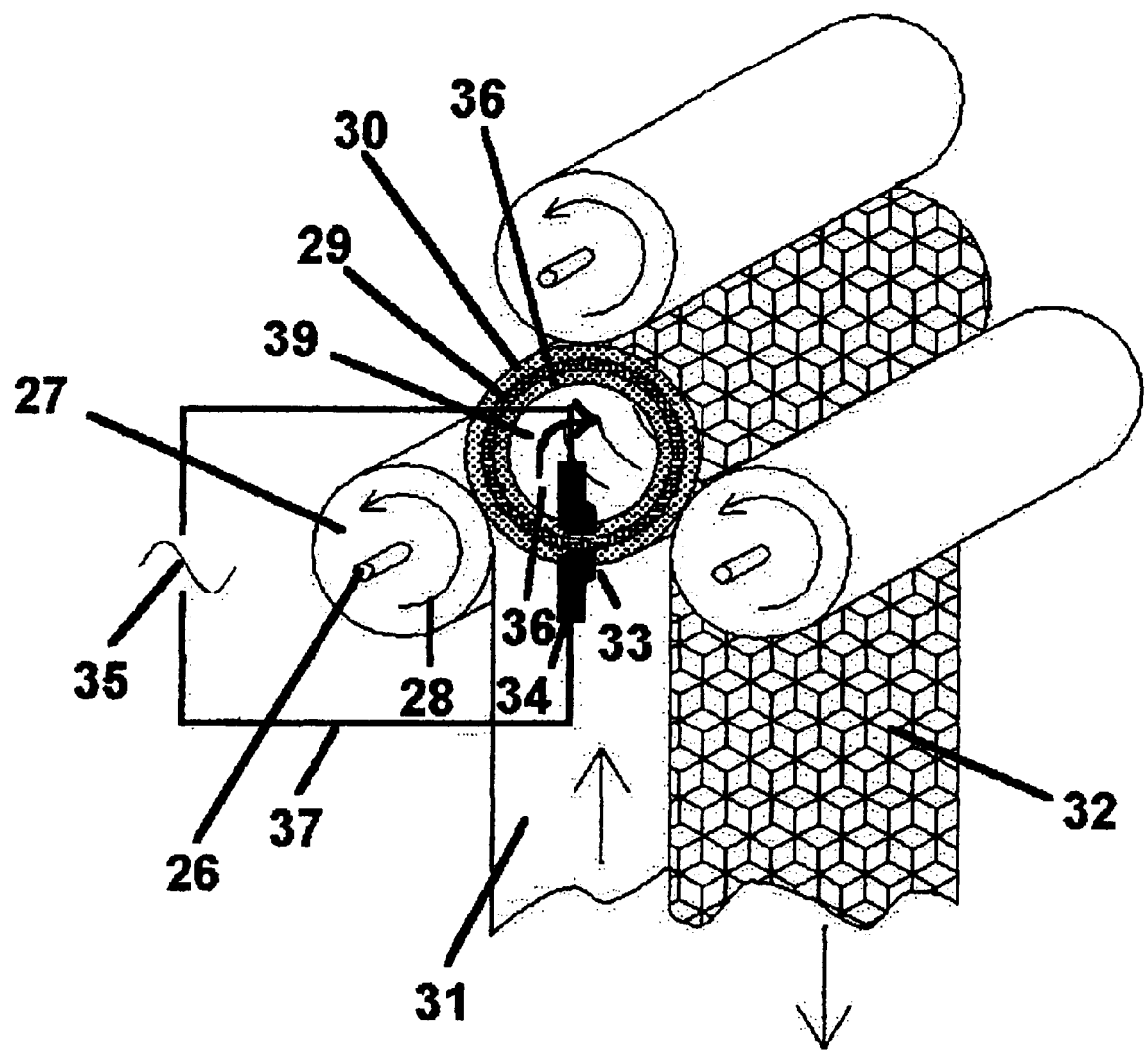
FIG. 8 is an isometric drawing of a rolling pin containing piezo-active elements for exciting radial motion contained within rotary anvils of a continuous process machine.

FIG. 8 illustrates one such example of a self-actuated rolling pin horn in a continuous process system.

Referring to FIG. 8, the rolling pin horn 36 is aligned centrally by three rotary anvils 27 spaced 120 degrees about its circumference, all pivoting on shafts 26 and rotating in direction 28. Process material 31 is wrapped around the rolling pin horn, contacting each of the anvils at their points of contact with the rolling pin horn. Rotation of the anvils rotates the rolling pin horn and its radial vibration, impressed upon the process material at the three points of contact with the anvils, alters the material is the desired fashion 32 as it leaves the system.

The rolling pin horn is composed of an outer layer 30, a middle layer 29 of piezo-active material, and an inner layer 36 whose inner diameter is contoured along its length so as to produce in response to displacements produced by the Piezo-active layer 29, uniform radial displacement over the surface in contact with the rotating anvils. The rolling pin horn 36 also rotates in response to the rotation of the anvils in the direction 37 shown.

Electrical contact to the piezo-active material is provided by slip rings 34 and brushes 33 contacting electrically conductive annular surfaces on the end of the rolling pin horn. An electrical generator 35, providing voltage and current of the appropriate frequency to excite resonant vibration of the rolling pin horn, is connected to the brushes by conductors 37.

Outer layer material 30 or the rolling pin horn may be different from inner layer 36. For example, as many processes utilizing vibratory contact induce wear on the contacting surfaces, outer material 30 may be of a material that is hardened to endure such wear or of a material that innately is inured to abrasion, such Monel, a nickel chromium alloy, or precipitation hardened steel or hardened titanium alloy or other material suitable for the particular process requirements.

The outer surface of the rolling pin horn may also bear a pattern, engraved, etched, stamped or otherwise altered for the particular purposes of any process and this surface may also be curved or have a shape required to match the requirements of the process or the contours of an anvil. In all such cases, suitable contouring the inner surface of the rolling pin can be made to provide substantially uniform radial displacement of the outer surface.

The piezo-active material may be piezoelectric, magnetostrictive or of any type that responds to an electrical or magnetic field with a change in its dimensions. It may, for example, be polycrystalline zirconium titanate or polyvinylidene fluoride, both known piezo-electric materials, or nickel, a magnetostrictive material.

Apparent to practitioners skilled in the art, the elements of this invention are intended to span all applications and frequencies of operation found useful or which may be found useful to the process industries, including, but not limited to, welding, laminating, cutting, drying, bonding, embossing, impregnating and forming which utilize the radial vibration of a cylindrical surface in continuous rotary motion and in contact with a process material and operating at frequencies of mechanical oscillation that extend from the infrasonic through the sonic and into the ultrasonic regimes.

I claim:

1. A hollow cylindrical mechanical resonator horn having no node of mechanical motion, an inner contoured surface whose diameter tapers from a maximum value at its center to minimum value at its ends, receiving an input radial displacement approximately about the circumference of the center of its inner surface, having an outer output surface and providing substantially uniform radial displacement in its entirety.

2. A hollow cylindrical mechanical resonator horn having no node of mechanical motion, made of at least two layers of material, one layer of which is made of piezo-active material, having an inner contoured surface whose diameter tapers from a maximum value at its center to minimum value at its ends, having an outer output surface and providing substantially uniform radial displacement in its entirety.

3. A horn of claim 2 wherein the piezo-active material is polycrystalline zirconium titanate.

4. A horn of claim 2 wherein the piezo-active material is polyvinylidene fluoride.

5. A horn of claim 2 wherein the piezo-active material is nickel.

* * * * *